United States Patent
Okumura et al.

(10) Patent No.: US 8,576,301 B2
(45) Date of Patent: Nov. 5, 2013

(54) DIGITAL CAMERA HAVING PLURALITY OF IMAGE RECORDING MEDIA AND CONTROL METHOD FOR THE SAME

(75) Inventors: Yoichiro Okumura, Hino (JP); Yoji Watanabe, Fuchu (JP)

(73) Assignee: Olympus Imaging Corp., Tokyo (JP)

( * ) Notice: Subject to any disclaimer, the term of this patent is extended or adjusted under 35 U.S.C. 154(b) by 1677 days.

(21) Appl. No.: 11/701,283

(22) Filed: Jan. 31, 2007

(65) Prior Publication Data

US 2007/0189731 A1 Aug. 16, 2007

(30) Foreign Application Priority Data

Feb. 10, 2006 (JP) .................................. 2006-033238

(51) Int. Cl.
H04N 5/76 (2006.01)

(52) U.S. Cl.
USPC ...................................................... 348/231.8

(58) Field of Classification Search
USPC ........ 348/231.6, 231.7, 231.8, 231.9, 231.99, 348/207.2, 223.1, 239, 222.1, 333.01, 348/333.12
See application file for complete search history.

(56) References Cited

U.S. PATENT DOCUMENTS

| | | | | |
|---|---|---|---|---|
| 5,150,458 A * | 9/1992 | Masuzaki et al. | ............. | 345/636 |
| 5,153,730 A * | 10/1992 | Nagasaki et al. | ......... | 348/231.6 |
| 6,333,752 B1 * | 12/2001 | Hasegawa et al. | ............ | 715/764 |
| 6,798,975 B1 * | 9/2004 | Fukushima | .................. | 386/224 |
| 6,992,711 B2 * | 1/2006 | Kubo | ......................... | 348/231.7 |
| 7,106,375 B2 * | 9/2006 | Venturino et al. | ....... | 348/333.02 |
| 8,164,654 B2 * | 4/2012 | Kaibara | ..................... | 348/231.2 |
| 2002/0018130 A1 * | 2/2002 | Suemoto et al. | .............. | 348/231 |
| 2003/0011687 A1 * | 1/2003 | Imura et al. | ................. | 348/231.2 |
| 2003/0146978 A1 * | 8/2003 | Toyoda | ...................... | 348/207.2 |
| 2003/0210335 A1 * | 11/2003 | Carau et al. | ................ | 348/231.2 |
| 2003/0234876 A1 * | 12/2003 | Bloom et al. | ............... | 348/231.3 |
| 2004/0046873 A1 * | 3/2004 | Kubo et al. | ................. | 348/222.1 |
| 2005/0062856 A1 * | 3/2005 | Matsushita | ................ | 348/222.1 |
| 2005/0128316 A1 * | 6/2005 | Sugimori | ................... | 348/223.1 |
| 2006/0268126 A1 * | 11/2006 | Ishibashi et al. | ......... | 348/231.99 |
| 2007/0189729 A1 * | 8/2007 | Oyama | ......................... | 386/107 |
| 2008/0151094 A1 * | 6/2008 | Ogawa | ..................... | 348/333.02 |

FOREIGN PATENT DOCUMENTS

| | | |
|---|---|---|
| JP | 07-135589 | 5/1995 |
| JP | 2004-254036 | 9/2004 |
| JP | 2005-080008 | 3/2005 |
| JP | 2005-175574 | 6/2005 |

OTHER PUBLICATIONS

"Kodak Professional—DCS ProSLR/n Digital Camera: User's Guide", Apr. 29, 2004.*
Chinese First Office Action for Chinese Patent Application No. 200710008241.0, dated Apr. 18, 2008 (5 pgs.) (with translation 3 pgs.)

* cited by examiner

*Primary Examiner* — Aung S Moe
*Assistant Examiner* — Chriss Yoder, III
(74) *Attorney, Agent, or Firm* — John C. Pokotylo; Straub & Pokotylo

(57) ABSTRACT

A digital camera is disclosed which has a first recording medium for recording captured images and a second recording medium, different from the first recording medium, for recording images obtained after editing the captured images. Since the edited images are recorded on the second recording medium, it is easy to sort out a desired image.

7 Claims, 7 Drawing Sheets

DIGITAL CAMERA HAVING PLURALITY OF IMAGE RECORDING MEDIA AND CONTROL METHOD FOR THE SAME

CROSS-REFERENCE TO RELATED APPLICATION

This application is based upon and claims the benefit of priority from prior Japanese Patent Application No. 2006-033238, filed on Feb. 10, 2006, the entire contents of which are incorporated herein by reference.

BACKGROUND OF THE INVENTION

1. Field of the Invention

The present invention relates to a digital camera having a plurality of recording media, and more particularly to a digital camera having a plurality of recording media and capable of editing of and protect setting for recorded images.

2. Description of the Related Art

It is common practice with a digital camera to store shot images on recording media (variously referred to as memory cards, storage media, recording media, etc.). Some of recently commercially available digital cameras can load two or more recording media at the same time. There is also a proposal to use plural recording media concurrently in order to enhance the functionality of a digital camera.

For example, an electronic camera is proposed in which image information is dividedly transferred and recorded in parallel onto a plurality of recording media during continuous shooting in order to improve the recording speed (Japanese Patent Application Laid-Open No. 7-135589). A digital camera is also proposed in which when one recording medium runs out of storage space during movie shooting, the movie is continuously recorded onto another recording medium (Japanese Patent Application Laid-Open No. 2005-80008). Further, a digital camera is proposed in which shot images are dividedly recorded on a plurality of recording media during continuous shooting in order to reduce data transfer time (Japanese Patent Application Laid-Open No. 2005-175574).

BRIEF SUMMARY OF THE INVENTION

The digital camera of the present invention uses at least a first recording medium and a second recording medium different from the first recording medium in such a manner that a captured image is recorded on the first recording medium, and upon editing, the image recorded on the first recording medium is read and subjected to editing processing, and the edited image is recorded on the second recording medium.

The term "editing processing" includes, for example, editing processing for image data (e.g., white balance adjustment, color balance adjustment, monotone conversion, sepia conversion, change in image size, etc.) and editing processing for attributes of image data (e.g., protection attribute adding processing, etc.). If at least part of these processing is performed, it can be said that the editing processing is performed.

An exemplary structure of the digital camera of the present invention can be expressed as follows: A digital camera having a plurality of image recording media comprises: an imaging part for capturing a subject image; a first image recording medium; a second image recording medium; an image processing part capable of performing editing processing on image data; and a control part for controlling the imaging part to acquire image data in response to a release operation and recording the acquired image data on the first recording medium, wherein the control part reads image data recorded on the first recording medium in response to an editing processing operation to supply the read image data to the image processing part, and records the image data edited by the image processing part on second recording medium.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

A preferred embodiment of the invention is described below with reference to the accompanying drawings.

Figure 1:
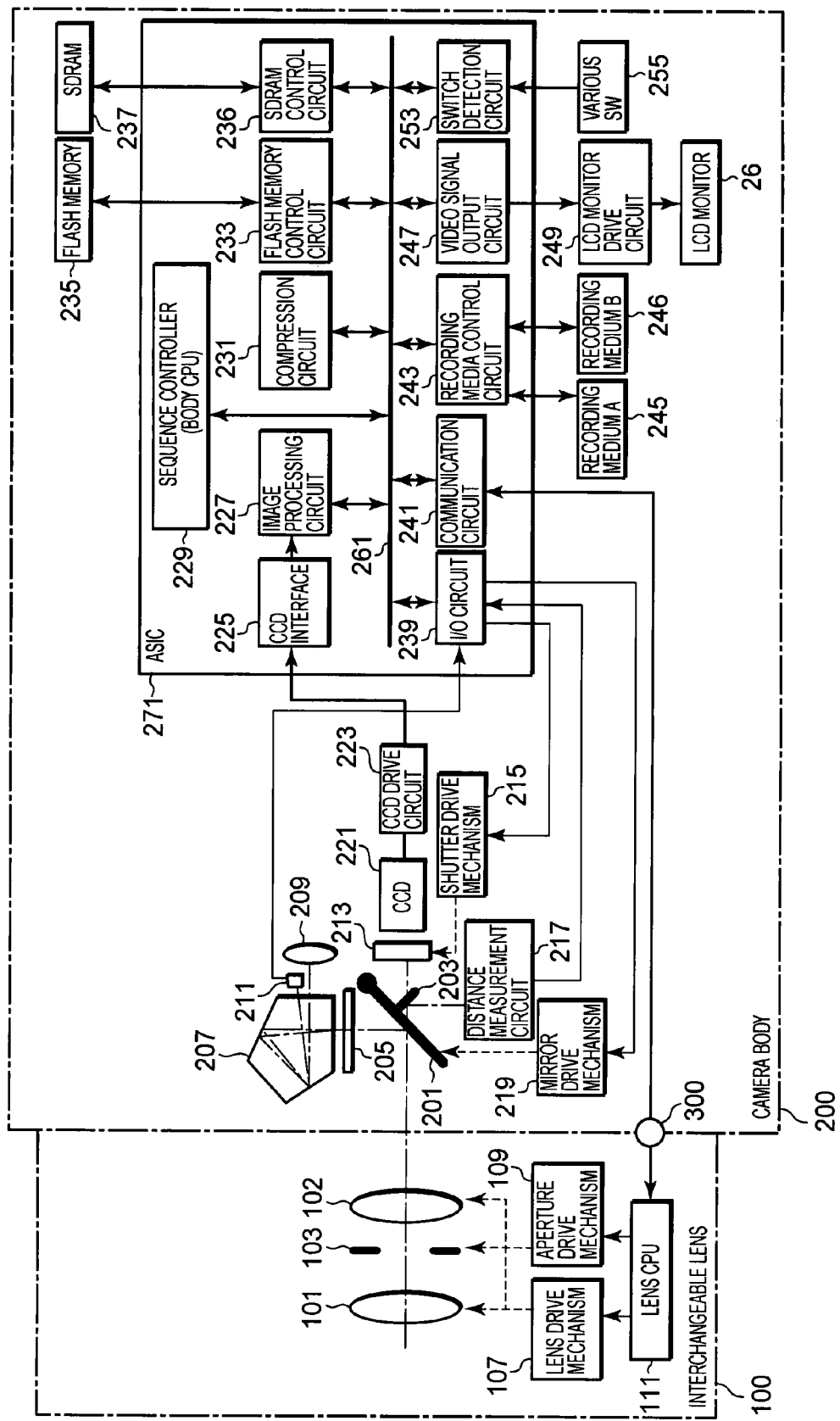
FIG. 1 is a block diagram showing the general structure of a single-lens reflex digital camera in an embodiment to which the present invention is applied.

FIG. 1 is a block diagram showing the general structure of a single-lens reflex digital camera according to an embodiment of the present invention. The single-lens reflex digital camera according to the embodiment includes an interchangeable lens 100 and a camera body 200. In the embodiment, the interchangeable lens 100 and the camera body 200 are constructed separately and electrically connected through a communication contact 300, but the interchangeable lens 100 and the camera body 200 can be integrally constructed.

Inside the interchangeable lens 100, lenses 101 and 102 for focusing adjustment and focal distance adjustment, and an aperture 103 for adjusting the amount of light passing therethrough are arranged. The lenses 101, 102 and the aperture 103 are so connected that the lenses 101, 102 will be driven by a lens drive mechanism 107 and the aperture 103 will be driven by an aperture drive mechanism 109. The lens drive mechanism 107 and the aperture drive mechanism 109 are connected to a lens CPU 111, respectively, and the lens CPU 111 is connected to the camera body 200 through the connection contact 300. The lens CPU 111 controls the components inside the interchangeable lens 100. In other words, the lens CPU 111 controls the lens drive mechanism 107 to perform focusing and zoom driving and controls the aperture drive mechanism 109 to control the aperture value.

A movable mirror 201 is provided inside the camera body 200. The movable mirror 201 is movable between a position 45 degrees inclined with respect to the lens optical axis to reflect a subject image into a finder optical system and a position flipped up to guide the subject image to an image pickup device (CCD 221 to be described later). A focusing screen 205 is arranged above the movable mirror 201 to form the subject image thereon. A pentaprism 207 is arranged above the focusing screen 205 to flip the subject image horizontally left to right. An eyepiece lens 209 used for viewing the subject image is arranged on the exit side of the pentaprism 207 (on the right side in FIG. 1). A photometric sensor 211 is arranged at the side of the eyepiece lens 209 at a position not to interfere with viewing of the subject image. The photometric sensor 211 is composed of multi-zone photometric elements for dividing the subject image and measuring the brightness of the subject image.

The central portion of the above-mentioned movable mirror 201 is formed into a half mirror. A sub-mirror 203 is provided on the backside of the movable mirror 201 to reflect a subject light beam, which has passed through the half mirror portion, downward in the camera body 200. This sub-mirror 203 is movable in response to the movement of the movable mirror 201. In other words, when the movable mirror 201 is flipped up, the sub-mirror 203 is moved to a position where it covers the half mirror portion, while when the movable mirror 201 is at the position for viewing the subject image, the sub-mirror 203 is at a position where it is perpendicular to the movable mirror 201 as shown in FIG. 1. This movable mirror 201 is driven by a mirror drive mechanism 219. Further, a distance measurement circuit 217 including a distance measurement sensor is arranged below the sub-mirror 203. This distance measurement circuit 217 measures the amount of defocus of the subject image imaged through the lenses 101 and 102.

A focal-plane type shutter 213 for control of exposure time is arranged behind the movable mirror 201. The driving of this shutter 213 is controlled by a shutter drive mechanism 215. A CCD (Charge Coupled Devices) 221 as an image pickup device is arranged behind the shutter 213 to photoelectrically convert the subject image imaged through the lenses 101 and 102 into an electric signal. In the embodiment, the CCD is used as the image pickup device, but the present invention is not limited thereto, and any other two-dimensional image pickup device such as a CMOS (Complementary Metal Oxide Semiconductor) can, of course, be used. The CCD 221 is connected to a CCD drive circuit 223 in which analog-digital conversion (AD conversion) is performed. The CCD drive circuit 223 is connected to an image processing circuit 227 through a CCD interface 225. This image processing circuit 227 performs various image processing, such as color correction, gamma (γ) correction, contrast correction, white balance adjustment, color balance adjustment, monotone conversion, sepia conversion, change in image size, etc.

The image processing circuit 227 is connected to a data bus 261 inside an ASIC (Application Specific Integrated Circuit) 271. Further connected to this data bus 261 are a sequence controller (hereinafter referred to as "body CPU") 229 to be described later, a compression circuit 231, a flash memory control circuit 233, an SDRAM control circuit 236, an I/O circuit 239, a communication circuit 241, a recording media control circuit 243, a video signal output circuit 247, and a switch detection circuit 253.

The body CPU 229 connected to the data bus 261 controls the overall flow of this single-lens reflex digital camera. The compression circuit 231 also connected to the data bus 261 is a circuit for compressing image data stored in an SDRAM 237 in a JPEG or TIFF format. The image compression method is not limited to JPEG or TIFF, and any other compression method can be employed. The flash memory control circuit 233 connected to the data bus 261 is connected to a flash memory 235. This flash memory 235 stores a program for controlling the overall flow of the single-lens reflex camera, and the body CPU 229 controls the single-lens reflex digital camera according to the program stored in this flash memory 235. The flash memory 235 is an electrically rewritable nonvolatile memory. The SDRAM 237 is connected to the data bus 261 through the SDRAM control circuit 236. This SDRAM 237 is a buffer memory for temporary storage of image data processed by the image processing circuit 227 or image data compressed by the compression circuit 231.

The I/O circuit 239 is connected to the photometric sensor 211, the shutter drive circuit 215, the distance measurement circuit 217, and the mirror drive mechanism 219, respectively, to control input and output of data to and from each circuit such as the body CPU 229 through the data bus 261. The communication circuit 241 connected to the lens CPU 111 through the communication contact 300 is connected to the data bus 261 to communicate with the body CPU 229 and the like for exchange of data and control instructions. The recording media control circuit 243 connected to the data bus 261 is connected to a recording medium A 245 and a recording medium B 246 to control recording or the like of image data onto the recording medium A 245 and the recording medium B 246. Each of the recording medium A 245 and the recording medium B 246 is a rewritable recording medium such as an xD-Picture Card™, a Compact Flash™, an SD Memory Card™, or a Memory Stick™. The camera body 200 is designed to enable the loading of these recording media, and the recording media are removably loaded into the camera body 200. The camera body 200 can also be configured to enable connection of a hard disk as a recording medium through a communication contact. The combination of the recording medium A 245 and the recording medium B 246 may be a combination of the same type recording media, or a combination of different types of recording media. For example, a combination can be considered, in which a high-capacity Compact Flash is used as the recording medium A 245 and a compact, easy-to-handle xD-Picture Card is used as the recording medium B 246.

The video signal output circuit 247 connected to the data bus 261 is connected to an LCD monitor 26 through a LCD monitor drive circuit 249. The video signal output circuit 247 is a circuit for converting image data, stored in the SDRAM 237, the recording medium A 245, or the recording medium B 246, into a video signal for display on the LCD monitor 26. The LCD monitor 26 is arranged on the backside of the camera body 200 (see FIG. 2 to be described later), but it is not limited to be arranged on the backside. The LCD monitor 26 can be placed in any position as long as the photographer can view it, and be of any type other than the LCD type. Various switches 255, such as switches for detecting first and second strokes of a release button 21 (see FIG. 2), a switch for instructing a playback mode, arrow pad switches for instructing the movement of a cursor on the screen of the LCD monitor 26, a mode dial switch for instructing a shooting mode, an OK switch for confirming each selected mode, a switch for changing recording media, a switch for an editing button, a switch for a protect setting button, a switch for an erase button, etc., are connected to the data bus 261 through the switch detection circuit 253.

Figure 2:
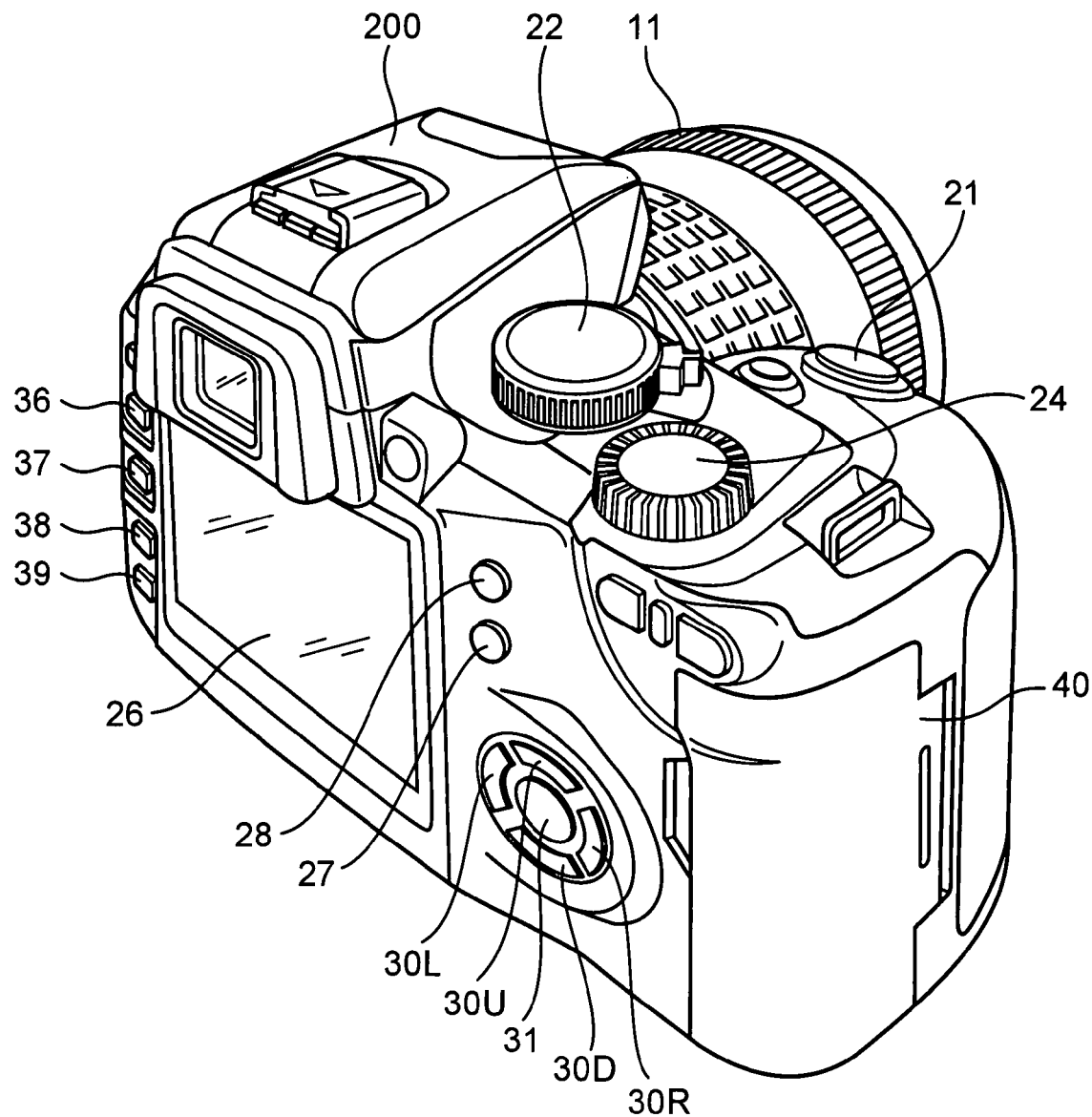
FIG. 2 is an exterior perspective view of the single-lens reflex digital camera in the embodiment of the present invention as viewed from its back side.

The following describes a single-lens reflex digital camera to which the present invention is applied with reference to an exterior perspective view of FIG. 2 in which the single-lens reflex digital camera is shown as viewed from its back.

The release button 21, a mode dial 22, a control dial 24, etc. are arranged on the top face of the camera body 200. The release button 21 has a first release switch to be turned on when the photographer presses the button halfway and a second release switch to be turned on when the photographer fully presses the button. When the first release switch (hereinafter abbreviated as "1R") is turned on, the camera performs shooting preparation operations such as focus detection, focusing of the photographing lens, light metering to measure the brightness of a subject, etc. Then, when the second release switch (hereinafter abbreviated as "2R") is turned on, the camera performs a shooting operation for capturing image data of a subject image based on the output of the CCD 221.

The mode dial 22 is an operation member configured to be movable. When the photographer sets the mode dial 22 to a pictorial or alphabetic icon provided on the mode dial to indicate a shooting mode, the shooting mode can be selected from among a full-auto shooting mode (AUTO), a program shooting mode (P), an aperture priority shooting mode (A), a shutter priority shooting mode (S), a manual shooting mode (M), a portrait shooting mode, a landscape shooting mode, a macro shooting mode, a sport shooting mode, a night scene shooting mode, etc. Among these modes, the full-auto shooting mode is a mode for allowing the camera to automatically set the aperture value and shutter speed for the lens, and if in low light, an electronic flash (not shown) automatically pops up to enable flash shooting. This mode is enough for common snapshots. The program shooting mode is a mode for automatically setting a combination of the aperture value and the shutter speed for optimum exposure. The aperture priority shooting mode is a mode for allowing the photographer to set an aperture value so that the camera will automatically set a shutter speed for optimum exposure. The shutter priority shooting mode is a mode for allowing the photographer to set a shutter speed so that the camera will automatically set an aperture value for optimum exposure. The manual shooting mode is a mode for allowing the photographer to set both the aperture value and the shutter speed.

The portrait shooting mode is a mode suitable for shooting a portrait-style image of a person. The landscape shooting mode is a mode suitable for shooting landscapes. The macro shooting mode is a mode suitable for taking a close-up picture of a subject. The sport shooting mode is a mode suitable for taking a picture of a moving subject at sports or the like. The night scene shooting mode is a mode suitable for shooting both a person as the subject and the background at night.

The control dial 24 is an operation member for setting shooting information such as the shutter speed, the aperture value, an ISO sensitivity, a compensation value, etc. The photographer can rotate the control dial to change various setting values.

Arranged on the backside of the camera body 200 are the LCD monitor 26, a playback button 27, a menu button 28, an UP arrow button 30U, a DOWN arrow button 30D, a RIGHT arrow button 30R, a LEFT arrow button 30L (these arrow buttons 30U, 30D, 30R, and 30L may be collectively referred to as "arrow pad 30" below), an OK button 31, a recording media change button 36, an editing button 37, a protect button 38, and an erase button 39. The LCD monitor 26 is a display device for displaying a shot subject image(s) and/or shooting conditions or a menu. The LCD monitor 26 is not limited to be the LCD type. It can be of any other type monitor as long as it can display the above-mentioned image(s) and/or shooting conditions or a menu. The playback button 27 is an operation button for instructing the display of a recorded subject image on the LCD monitor 26. The subject image data compressively stored in a compression format such as JPEG in the SDRAM 237, or on the recording medium A 245 or the recording medium B 246 as mentioned above is decompressed and displayed. The playback button 27 is also used to read a recorded image to be edited or upon protect setting as will be described later.

The arrow pad 30 is an operation member for instructing the movement of the cursor two-dimensionally in X and Y directions on the LCD monitor 26. It is also used to instruct a frame upon displaying a corresponding subject image recorded on a recording medium. The four buttons for UP, DOWN, RIGHT, and LEFT can be replaced with a switch such as a touch switch capable of detecting a two-dimensionally operated direction, a swingable switch having a single operation member capable of being swingably operated, or the like. The OK button 31 is an operation member for confirming each item selected using the arrow pad 30 or the control dial. The menu button 28 is a button for switching to the menu mode. When the photographer operates the menu button 28 to select a menu mode, a corresponding menu screen appears on the LCD monitor 26. The menu screen has a hierarchy structure consisting of a plurality of sub-menu screens so that the photographer can select each of various items using the arrow pad 30 and confirm the selected item by operating the OK button 31.

The recording media change button 36 is an operation button for changing recording media as a source of image data to be displayed on the LCD monitor 26. In the embodiment, image data are recorded on the recording medium A 245 during normal shooting. Then, when editing processing, such as white balance adjustment, is performed on original image data, the edited image data is automatically recorded on the recording medium B 246. The editing button 37 is a button used upon editing original image data in the manner as mentioned above.

The erase button 39 is an operation button for erasing image data recorded on the recording medium A 245. Any image data that is being displayed on the LCD monitor 26 can be erased with an operation of the erase button 39. The protect button 38 is an operation button for setting protection beforehand for an image the user does not want to erase in order to prevent accidental erase due to an erroneous operation of the erase button 39. The user can operate the protect button 38 again to cancel the protection. The operation of the protect setting will be described later.

Figure 3:
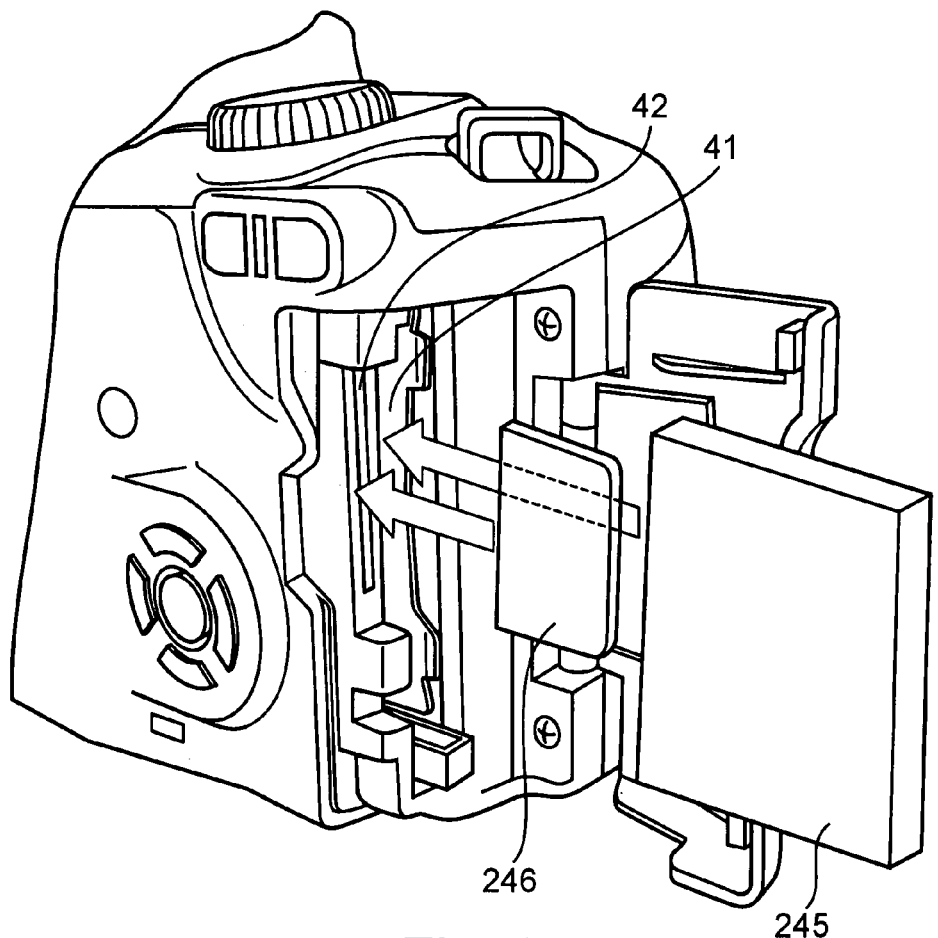
FIG. 3 is a perspective view showing a loading state of a recording medium A and a recording medium B in the embodiment of the present invention.

A recording media compartment cover 40 is attached to one side of the camera body 200 to freely open/close. As shown in FIG. 3, when this recording media compartment cover 40 is opened, there are a loading slot 41 for the recording medium A 245 and a loading slot 42 for the recording medium B 246 provided inside the recording media compartment. These recording media A 245 and B 246 are adapted to be removably loaded into the camera body 200.

Figure 4:
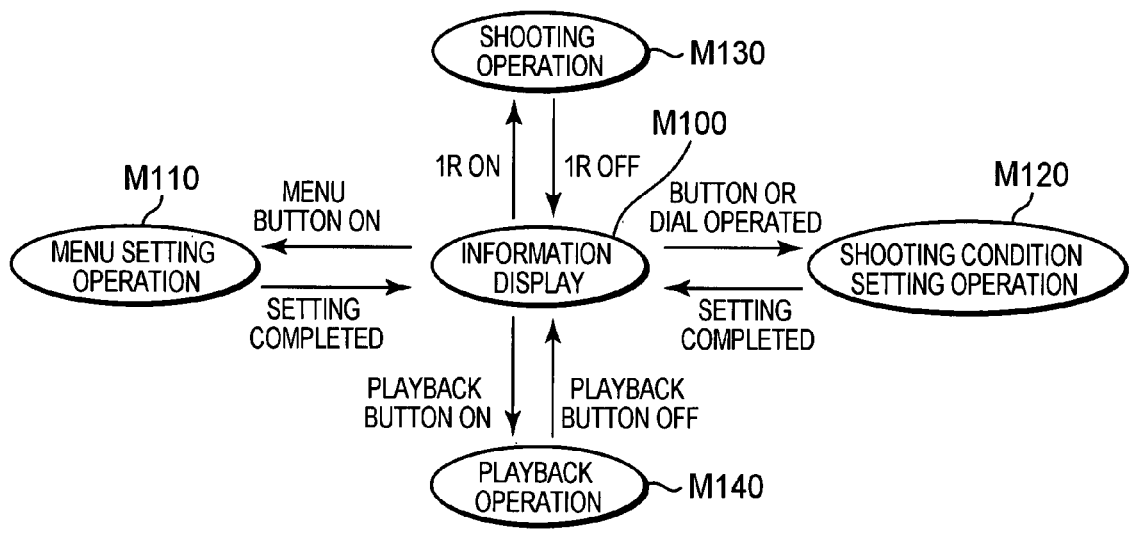
FIG. 4 is a block diagram showing display and operation modes in the embodiment of the present invention.

The following outlines display and operation modes of the camera body 200 with reference to FIG. 4.

Information display M100 appears when a power switch of the camera body 200 is turned on. In this condition, if the menu button 28 is operated, the camera enters a menu setting operation M110, and a menu setting display appears on the LCD monitor 26. Under this condition, various items are selectable using the arrow buttons 30U, 30D, 30L, and 30R, and each selected item is confirmed with an operation of the OK button 31. After that, the menu setting operation M110 is completed and the camera returns to the information display M100. On the menu setting display, each of various modes, such as an image quality mode, a flash mode, a flash compensation mode, a timer shooting mode, a sequential/single-frame shooting switching mode, an autofocus mode (single AF or a continuous AF), etc. can be set. Further, the camera enters a shooting condition setting operation M120 such as to set a shooting mode, an ISO sensitivity, etc. with an operation of the mode dial 22. In this setting operation M120, each of shooting conditions can be selected with an operation of the control dial 24, and the selected shooting condition is confirmed by turning on the OK button 31. After that, the camera returns to the information display M100.

Under the state of the information display M100, if the release button 21 is pressed halfway, the 1R switch is turned on and the camera enters a shooting operation M130. Then, if the photographer removes his or her finger from the release button 21 to cancel the half-press, the camera returns to the information display M100. In this shooting operation M130, shooting preparation operations are performed. Then, when the release button 21 is pressed fully, a signal photoelectrically converted from the subject image is captured and subjected to image processing. The processed image data is recorded on the recording medium A 245. On the other hand, under the state of the information display M100, if the playback button 27 is operated and turned on, the camera performs a playback operation M140. The playback operation M140 is to display a recorded image(s) on the LCD monitor 26 based on image data recorded on the recording medium A 245 or the recording medium B 246, allowing the photographer to instruct a shot frame(s) by operating the arrow pad 30.

Figure 5:
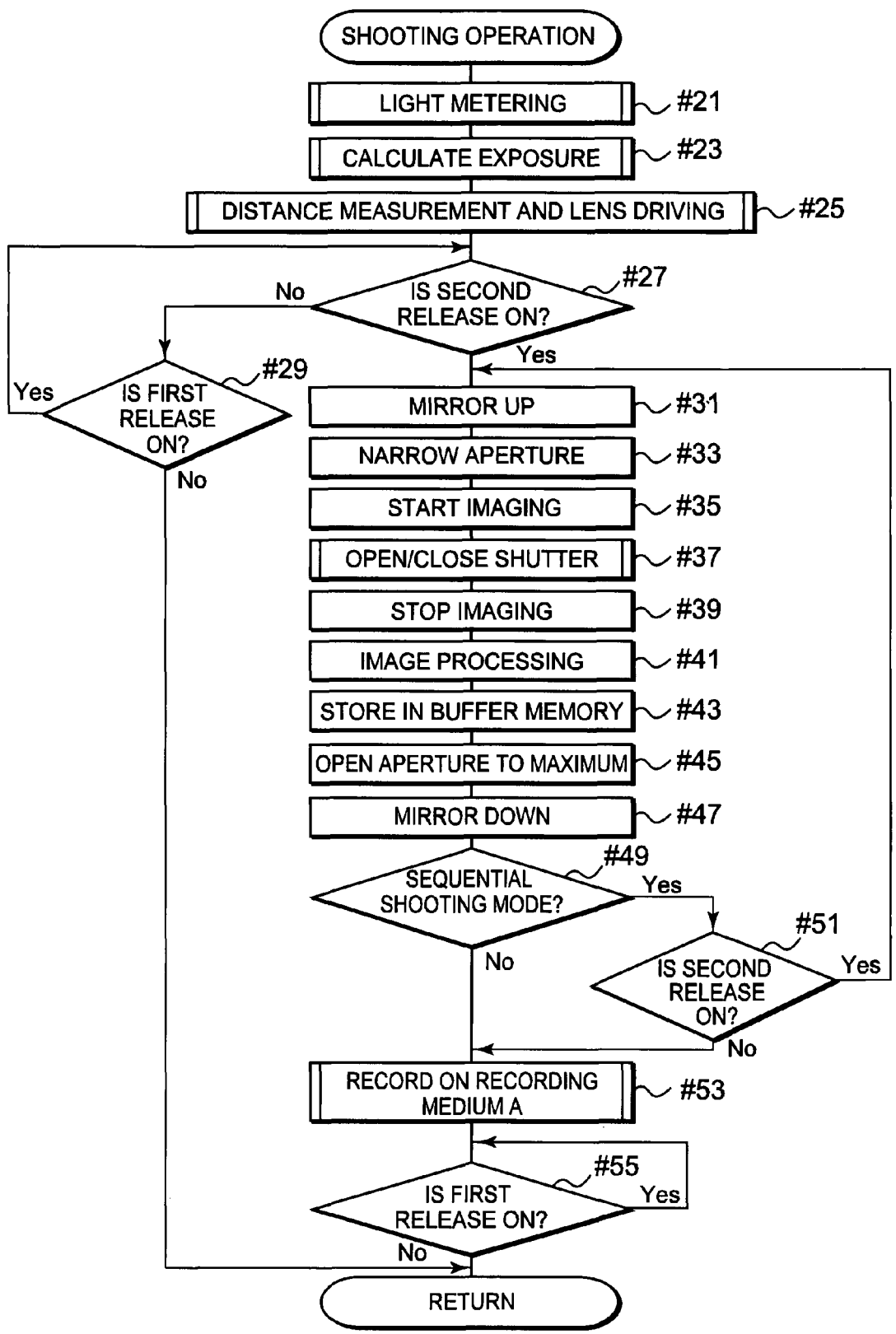
FIG. 5 is a flowchart showing a shooting operation in the embodiment of the present invention.

Referring next to a flowchart of FIG. 5, the above-mentioned shooting operation M130 will be described in detail.

When the release button 21 is pressed halfway, the camera enters a shooting operation to measure the brightness of a subject based on the output of the photometric sensor 211 (#21). Based on the obtained subject brightness, the shutter speed and/or the aperture value are calculated (#23). The shutter speed and/or the aperture value are calculated according to the above-mentioned shooting mode. Then, based on the output of the distance measurement circuit 217, the amount of defocus of the photographing lenses 101 and 102 is calculated to drive the lens drive circuit 107 through the lens CPU 111 based on the amount of defocus, thus performing a focusing operation.

After completion of the focusing of the photographing lenses 101 and 102, it is determined whether the release button 21 has been pressed fully to turn on the second release switch (#27). If the second release switch is not on-state, it is determined whether the release button 21 has been pressed halfway to turn on the first release switch (#29). If it is determined that the first release switch is on-state, it means that the release button 21 remains pressed halfway, but not pressed fully yet. Therefore, the camera enters a waiting state in which steps #27 and #29 are repeated. Then, in step #29, if the photographer has removed his or her finger from the release button 21 to turn off the first release switch, the procedure follows the No branches to return to the initial routine.

On the other hand, if the release button 21 is pressed fully, the second release switch is turned on in step #27, so that actual imaging and recording of image data are performed in steps starting at step #31. First, the movable mirror 201 is flipped up (#31) to focus subject light that passed through the photographing lenses 101 and 102 on the CCD 221 to form a subject image. Then, narrowing of the aperture 103 is started (#33), and imaging by the CCD 221 is started (#35). Concurrently, traveling of a front curtain of the shutter 213 is started, and after a predetermined period of time, traveling of a rear curtain is started (#37). After that, imaging by the CCD 221 is stopped (#39), the CCD drive circuit 223 reads out an image signal, and the image processing circuit 227 performs image processing (#41). The image data after subjected to this image processing is stored in the SDRAM 237 as a buffer memory (#43). Then, the aperture 103 is opened to the maximum (#45), and the movable mirror 201 is flipped down (#47) to let a finder optical device be in such a state to allow the photographer to view the subject image.

After that, it is determined whether the shooting mode is a sequential shooting mode (#49). If it is determined that the shooting mode is the sequential shooting mode, it is then determined whether the release button remains pressed fully (#51). If it is determined that the release button remains pressed fully, that is, the second release switch remains on, the procedure returns to step #31 to repeat shooting. On the other hand, when the photographer removes his or her finger from the release button to turn off the second release switch, the sequential shooting is completed (No in step #51). If it is determined in step #49 that the shooting mode is not the sequential shooting mode or when the sequential shooting mode is completed, the procedure goes to step #53 in which image data recorded in the buffer memory such as the SDRAM 237 are recorded on the recording medium A 245 (#53). Then, it is determined whether the release button remains pressed halfway, that is, whether the first release switch remains on (#55). If it remains on, the camera waits until the first release switch is turned off, and once it is turned off, the procedure returns to a power-on reset routine.

Figure 6:
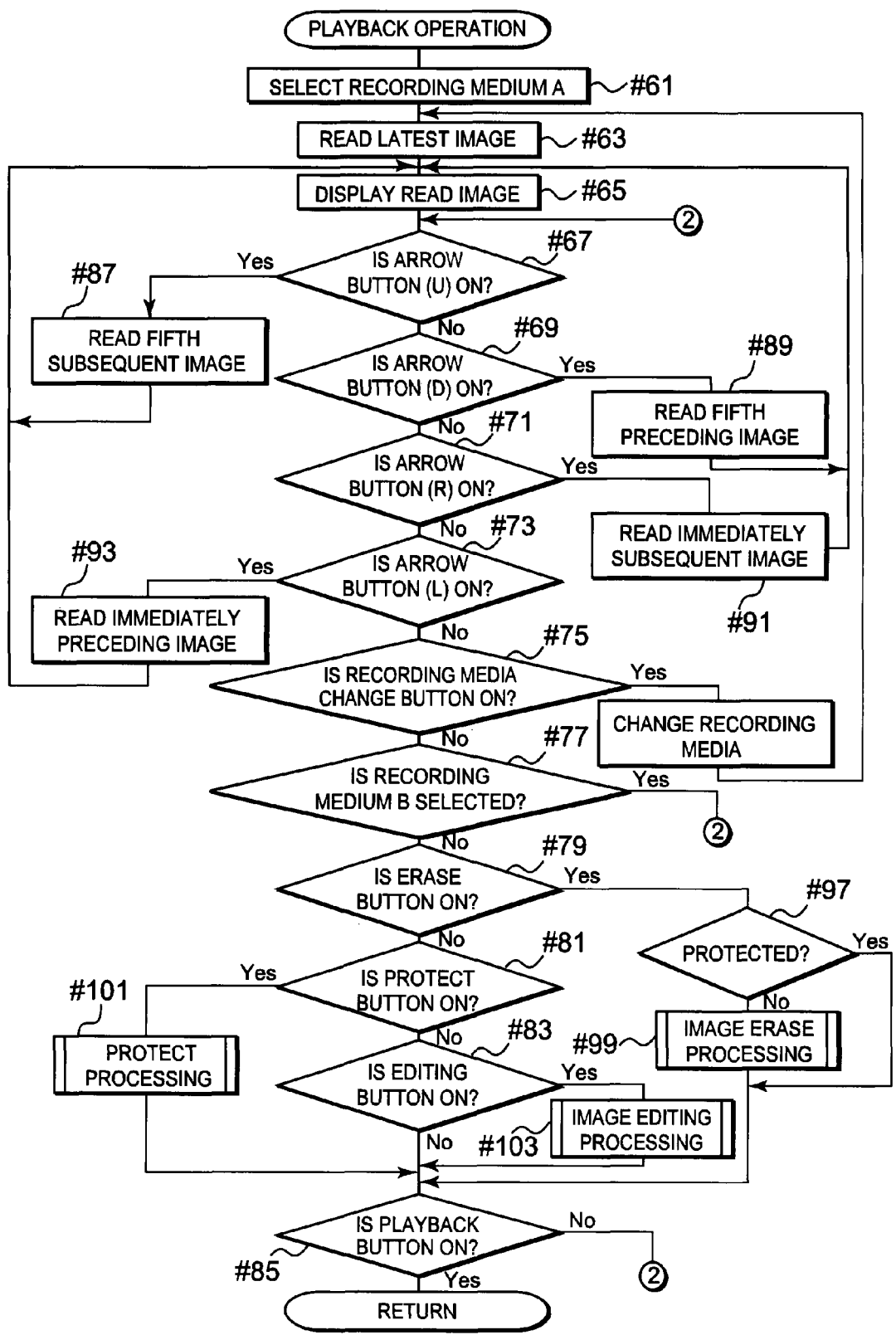
FIG. 6 is a flowchart showing a playback operation in the embodiment of the present invention.

Referring next to a flowchart of FIG. 6, the above-mentioned playback operation M140 will be described in detail.

When the playback button 27 is operated, the camera enters the playback operation. First, in this playback operation, the recording medium A 245 is selected (#61). Here, the recording medium A 245 is selected, because during shooting image data are always recorded on the recording medium A 245 in a subroutine in the shooting operation in FIG. 5. Then, the latest image data recorded on the selected recording medium A 245 is read out (#63) to display the latest image on the LCD monitor 26 based on the read-out latest image data (#65). Then, the procedure goes to step #67 in which it is determined whether the UP arrow button 30U is on-state. If it is on-state, that is, when it has been operated, the procedure goes to step #87 in which an image corresponding to the fifth frame subsequent to the frame of the image data currently being read is read out. After that, the procedure returns to step #65 to display the image. On the other hand, if the UP arrow button 30U is not operated, the procedure goes to step #69 in which it is determined whether the DOWN arrow button 30D is on-state. If the DOWN arrow button 30D is on-state, that is, when it has been operated, the procedure goes to step #89 in which an image corresponding to the fifth frame previous to the frame of the image data currently being read is read out. After that, the procedure returns to step #65 to display the image. Thus, in the playback mode, the UP arrow button 30U is assigned as a button for displaying an image corresponding to the fifth frame subsequent to the frame of the image currently being displayed, while the DOWN arrow button 30D is assigned as a button for displaying an image corresponding to the fifth frame previous to the frame of the image currently being displayed. The camera determines whether the UP or DOWN arrow button 30U or 30D has been operated to select whether to skip five frames of display images.

Then, in step #71, it is determined whether the RIGHT arrow button 30R has been operated. If it has been operated, image data corresponding to the immediately subsequent frame is read out (#91). If No in step #71, the procedure goes to step #73 in which it is determined whether the LEFT arrow button 30L has been operated. If the LEFT arrow button 30L has been operated, image data corresponding to the immediately preceding frame is read out (#93). After the corresponding image is read out in step #91 or #93, the procedure returns to step #65 to display the read image.

If none of the arrow buttons 30U, 30D, 30R, and 30L has not been operated, the procedure goes to step #75 in which it is determined whether the recording media change button 36 for changing recording media has been operated. In the embodiment, original image data are recorded on the recording medium A 245, and edited image data are recorded on the recording medium B 246, dividing the recording destination into the recording media according to the presence or absence of editing. As a result of determination, if the recording media change button 36 has been operated, the procedure goes to step #95 in which the recording medium is changed to B246. After that, the procedure returns to step #63 to read the latest image.

On the other hand, if it is determined in step #75 that the recording media change button 36 has not been operated, it is then determined whether the recording medium B 246 is selected. Here, since the recording medium B 246 is exclusively used for recording edited images and any editing is not allowed in steps #79 to #83, the procedure returns to step #67. After that, only the images recorded on the recording medium B 246 are displayed. On the other hand, if the recording medium B 246 is not selected, the procedure goes to step #79 in which it is determined whether the erase button 39 has been operated. If the erase button 39 has been operated, the procedure goes to step #97 in which it is determined whether image data is protected, that is, whether protect setting has been done to prevent accidental erase. As a result of determination, if the image data is protected, the procedure goes to step #85 without erasing image data, while if the image data is not protected, the procedure goes to step #99 to erase the selected image data.

On the other hand, if it is determined in step #79 that the erase button 39 has not been operated, the procedure goes to step #81 in which it is determined whether the protect button 38 has been operated to prevent accidental erase. If the protect button 38 has been operated, the procedure goes to step #101 to perform protect processing (the details of which will be described later), and the procedure shifts to step #85. On the other hand, if the protect button 38 has not been operated, the procedure goes to step #83 in which it is determined whether the editing button 37 has been operated. If it has been operated, the procedure goes to step #103 to execute an image editing subroutine. In this subroutine, various editing processing, such as white balance adjustment, color-balance adjustment, etc., is performed on an original image recorded on the recording medium A 245, the details of which will be described later. After completion of the protect processing (#101), the image editing processing (#103), the editing button determination (#83), the image erase processing (#99), or the protect determination (#97), the procedure shifts to step #85 in which it is determined whether the playback button 27 is on-state. The playback operation is started when the playback button 27 is operated once and turned on, while it is completed when the playback button 27 is operated again and turned on. Therefore, if the determination result in step #85 is No, the procedure returns to step #67 to continue the playback operation. On the other hand, if the determination result in step #85 is Yes, since the playback button 27 has been operated again, the playback operation is completed and the procedure returns to the initial routine.

Figure 7:
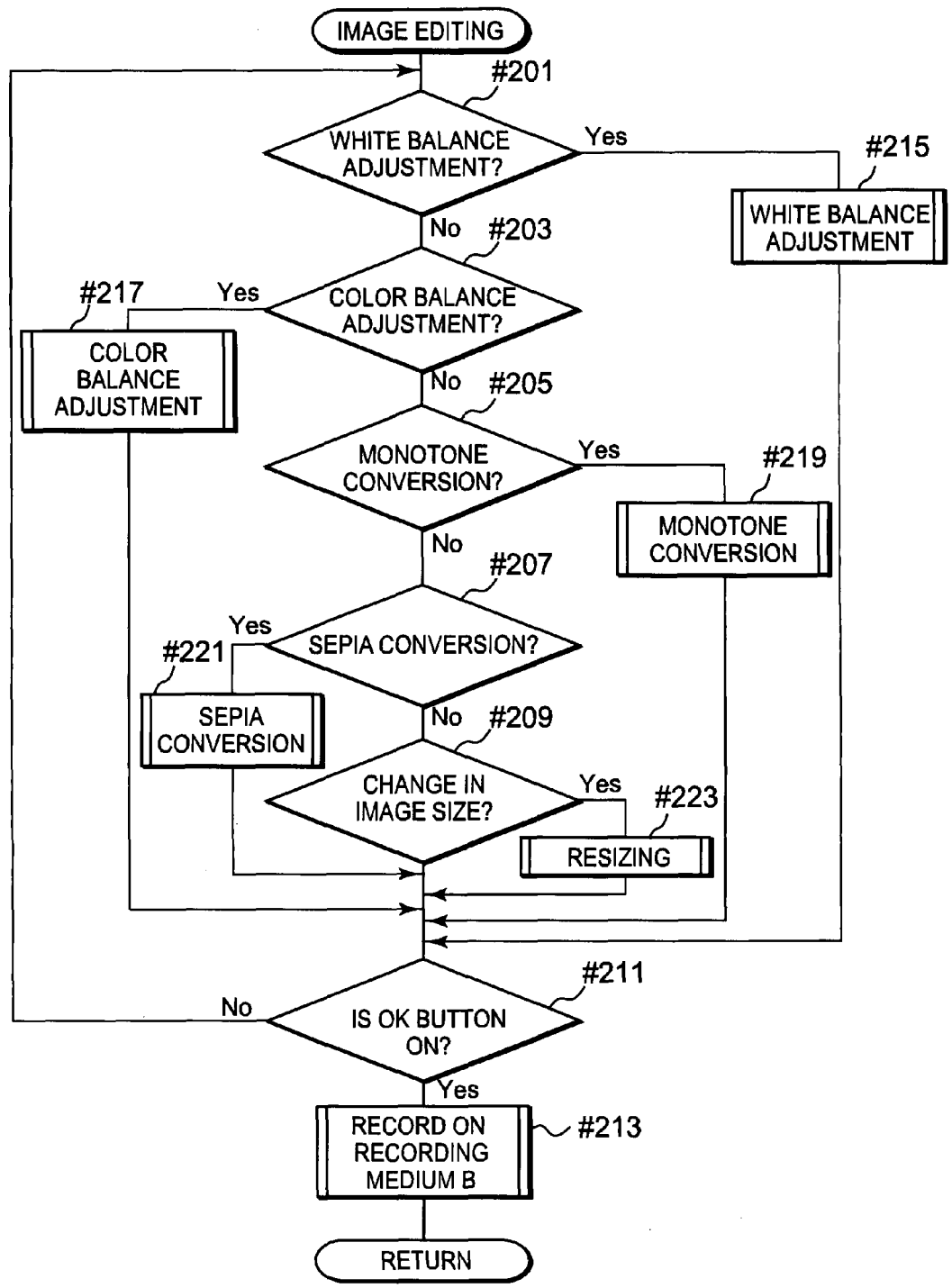
FIG. 7 is a flowchart showing an image editing operation in the embodiment of the present invention.

Referring next to FIG. 7, the above-mentioned "image editing" in step #103 will be described. When the editing button 37 is operated, an image editing menu screen appears on the LCD monitor 26. On this menu screen, items such as white balance adjustment, color balance adjustment, monotone conversion, sepia conversion, and change in image size are displayed so that the user can operate the arrow pad 30 to select an editing item and an option to be displayed below each item as a sub-menu.

When the camera enters the image editing subroutine, it is first determined in step #201 whether white balance adjustment is selected. If the white balance adjustment is selected, the procedure shifts to step #215 in which any one of Sunlight, Cloud, Shade, Fluorescent, One-touch white balance, etc. from the sub-menu to adjust original image depending on the color temperature. After the selection, the selected white balance adjustment is confirmed in step #211 using the OK button 31. On the other hand, if the white balance adjustment is not selected, the procedure goes to step #203 in which it is determined whether color balance adjustment is selected. If the color balance adjustment is selected, the procedure shifts to step #217 to perform color balance adjustment on original image data, and after adjustment, the selected color balance adjustment value is confirmed in step #211 using the OK button 31.

On the other hand, if the color balance adjustment is not selected in step #203, it is then determined whether monotone conversion is selected. If the monotone conversion is selected, the procedure goes to step #219 in which original image data is converted into a black-and-white, that is, grayscale display image, and the monotone conversion is confirmed in step #211 by operating the OK button 31. On the other hand, if the monotone conversion is not selected, the procedure goes to step #207 in which it is determined whether sepia conversion is selected. If the sepia conversion is selected, the procedure shifts to step #221 in which the sepia conversion is performed on original image data, and the selected sepia conversion is confirmed in step #211 using the OK button 31.

On the other hand, if the sepia conversion is not selected, the procedure goes to step #209 in which it is determined whether a change in image size is selected. If the change in image size is selected, the procedure goes to step #223 to change the image size. For example, image data is resized from 3200×2400 to 640×480. Note that the number of pixels can be reduced, but a change from a larger image data size to smaller is not made in this example.

After completion of the above step #203, #209, #215, #217, #219, or #221, the selected value is confirmed using the OK button 31 and the edited image data is recorded on the recording medium B 246. On the other hand, if the selected value is not confirmed using the OK button 31, the procedure returns to step #201 again to repeat the above-mentioned steps.

Thus, in the image editing routine, after editing, such as white balance adjustment, color balance adjustment, monotone conversion, sepia conversion, change in image size, etc. is performed on image data read from the recording medium A 245, the edited image data is recorded in step #213 on the recording medium B 246. This makes it possible to automatically divide the recording destination between the original image data and the edited image data.

Figure 8:
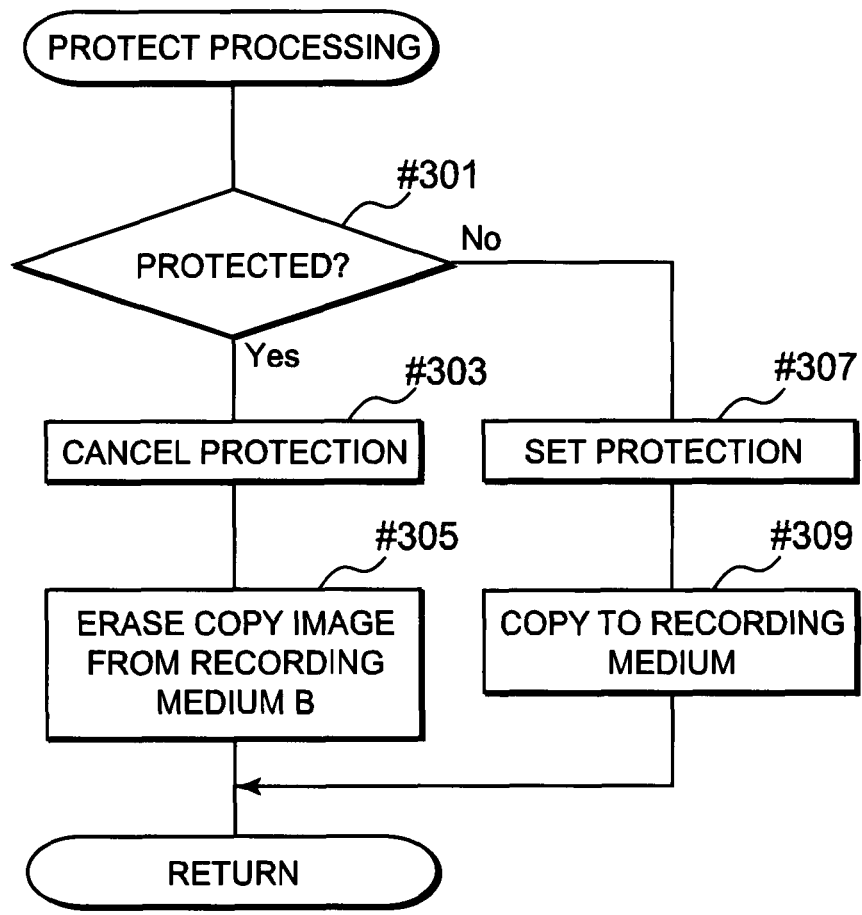
FIG. 8 is a flowchart showing protect processing in the embodiment of the present invention.

Referring next to FIG. 8, the above-mentioned "protect processing" in step #101 will be described in detail. In order to prevent accidental erase, any image the user does not want to erase accidentally is first read out from the recording medium A 245 and displayed on the LCD monitor 26. In this condition, the user operates the protect button 38 to protect the image. When the camera enters a protection processing routine, it is first determined whether the image is protected (#301). If it is already protected, the procedure goes to step #303 to cancel the protect setting. Then, the copy image recorded on the recording medium B 246 is erased (#305). On the other hand, if the image is not protected, the procedure goes to step #307 to set protection. Then, the copy image is also recorded in step #309 on the recording medium B 246.

In the embodiment, when the protect button 38 is operated, the accidental erase preventing function is enabled, while when the protect button 38 is operated again after setting protection, the accidental erase preventing function is disabled. Since it is determined in step #301 whether an image is protected or not, the setting and cancellation of protection using the protect function can be changed by operating the single button. Further, when protection is set using the protect function, even if the erase button 39 is operated to erase image data, the image data is erased after the presence or absence of protect setting is determined in step #97. This can prevent accidental erase.

Further, in the embodiment, not only is protection set, but also a copy image is recorded on the recording medium B 246. Since the image to be protected is typically important image, the important image is also recorded on the recording medium B 246 together with the edited images. This feature is very convenient for organizing shot image data. In addition, in the embodiment, when the protect setting is cancelled, the copy image is also deleted automatically, saving the user from having to delete the copy image manually.

In the embodiment, the original of edited image data remains intact on the recording medium A 245, but the present invention is not limited thereto. The original image data can be moved or copied to the recording medium B 246. Alternatively, the camera can be configured to allow the user to select whether to move or copy the original image data to the recording medium B 246.

As described above, according to the embodiment of the present invention, original images are recorded on the recording medium A 245, and when editing such as white balance adjustment is performed on any original image, the edited image is automatically recorded on the recording medium B 246. In other words, the original image is recorded on the recording medium A 245 and the edited image is recorded on the recording medium B 246. It means that no edited image is recorded on the recording medium A 245. In addition, if no original image is moved or copied to the recording medium B 246, the original image data and the edited image data are never mixed on a single recording medium. This can make it easy for the user to sort out a desired image. Further, copies of important image data to be protected are automatically recorded on the recording medium B 246, so that image data for which protection are not set, that is, image data of little importance, and important image data for which protection are set are recorded separately on different recording media. This can make it easy for the user to sort out an important image.

In the embodiment, although both the image data on which editing such as white balance adjustment was performed and the image data for which protection is set are recorded on one recording medium different from the other recording medium for original images, either of the image data can, of course, be recorded on the recording medium different from that for original images.

The embodiment is described in a case where the present invention is applied to a single-lens reflex type digital camera, but the present invention is not limited to application to the single-lens reflex digital camera. For example, the present invention is also applicable to any other digital camera such as a compact type and a digital camera equipped in a cellular phone. Further, in the embodiment, the digital camera is configured to be capable of loading two recording media A and B, but it can, of course, be configured to be able to load three or more recording media.

While there has been shown and described what is considered to be a preferred embodiment of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A digital camera using a plurality of image recording media, comprising:
    an image pickup device configured to capture a subject image to acquire original image data;
    an image processing circuit configured to perform image editing, responsive to a manual user editing operation, to generate edited image data; and
    a controller configured to exclusively select a first image recording medium to record the original image data, exclusively select a second image recording medium other than the first image recording medium to record the edited image data,
    wherein the manual user editing operation is allowed on the original image data stored in the first image recording medium but is not allowed on the edited image data stored in the second recording medium.

2. The digital camera according to claim 1, wherein the first and second image recording media are memory cards.

3. The digital camera according to claim 1 further comprising a display capable of displaying the original image data read from the first image recording medium and the edited image data edited by the image processing circuit.

4. The digital camera according to claim 1, wherein the image processing circuit performs editing processing on a single image selected by a user.

5. A control method for a digital camera using a plurality of image recording media, the control method comprising:
    capturing a subject image to acquire original image data;
    performing image editing processing in response to a manual user editing operation to generate edited image data; and
    selecting exclusively a first image recording medium to record the original image data and exclusively a second image recording medium other than the first image recording medium to record the edited image data
    wherein the manual user editing operation is allowed on the original image data stored in the first image recording medium but not allowed on the edited image data stored in the second recording medium.

6. The control method according to claim 5, wherein the editing processing is performed on a single image selected by a user.

7. The control method according to claim 6, wherein performing image editing processing on the single image includes
    reading an original image from the first image recording medium,
    displaying the read image on a display of the digital camera,
    receiving an instruction, by the user, for performing manual user editing processing operation on the displayed image, and
    performing the image editing processing, responsive to the manual user editing processing operation, displaying the edited image on the display.

* * * * *